United States Patent [19]
Lloyd et al.

[11] 3,861,420
[45] Jan. 21, 1975

[54] FLUID CONTROL VALVE
[75] Inventors: Arthur Leslie Lloyd; Dereck Roger Beasley, both of Wolverhampton, England
[73] Assignee: Lucas Aerospace Limited, Birmingham, England
[22] Filed: Apr. 11, 1973
[21] Appl. No.: 349,963

[30] Foreign Application Priority Data
Apr. 19, 1972 Great Britain.................... 18207/72

[52] U.S. Cl.......... 137/625.43, 137/625.23, 251/175
[51] Int. Cl.............................................. F16k 11/02
[58] Field of Search....... 137/625.43, 625.4, 625.48, 137/625.5, 625.21–625.24, 625.46, 625.47; 351/171, 173, 174, 175, 182, 192

[56] References Cited
UNITED STATES PATENTS
| | | | |
|---|---|---|---|
| 1,591,903 | 7/1926 | White | 251/175 |
| 2,422,796 | 6/1947 | Monroe et al. | 251/175 X |
| 2,703,586 | 3/1955 | Asker | 137/625.43 |
| 2,904,305 | 9/1959 | Novotny | 251/175 |
| 2,907,349 | 10/1959 | White | 137/625.47 X |
| 2,946,348 | 7/1960 | North | 137/625.47 X |
| 3,097,666 | 7/1963 | Antrim et al. | 251/357 X |
| 3,194,270 | 7/1965 | Viessmann | 137/625.43 |

*Primary Examiner*—Henry T. Klinksiek
*Attorney, Agent, or Firm*—Holman & Stern

[57] ABSTRACT

A fluid control valve has a control member rotatable in a bore to selectively interconnect a plurality of ports which open into the bore. The control member includes a body in which a plurality of vanes are slidable to sealingly engage the bore. Passages in the control member enable the one of the ports which is at high pressure to communicate with a face of the vanes to urge the latter into sealing contact with the bore.

4 Claims, 3 Drawing Figures

PATENTED JAN 21 1975　　　　　　　3,861,420

FLUID CONTROL VALVE

This invention relates to valves for fluids.

A valve according to the invention comprises a housing having a cylindrical bore, a plurality of ports in said housing communicating with said bore, a first port providing, in use, an inlet connection, a control member mounted within said bore for pivotal movement about the axis of said bore so as selectively to interconnect said ports, said control member including a body, a plurality of sealing elements mounted on said body and engageable with said bore, and passages in said body, via which passages a face on each sealing element can communicate with said one port so that a high pressure in said one port can urge said elements into contact with said bore.

In a preferred embodiment of the invention the sealing elements are arranged in pairs and the passage associated with at least one of said sealing elements does not communicate with said one port.

An example of the invention will now be described with reference to the accompanying drawings, in which.

Figure 1:
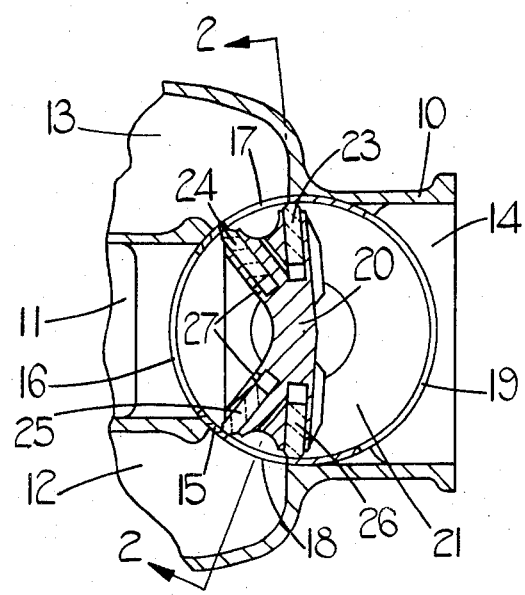
FIG. 1 is a transverse section through a valve.
Figure 2:
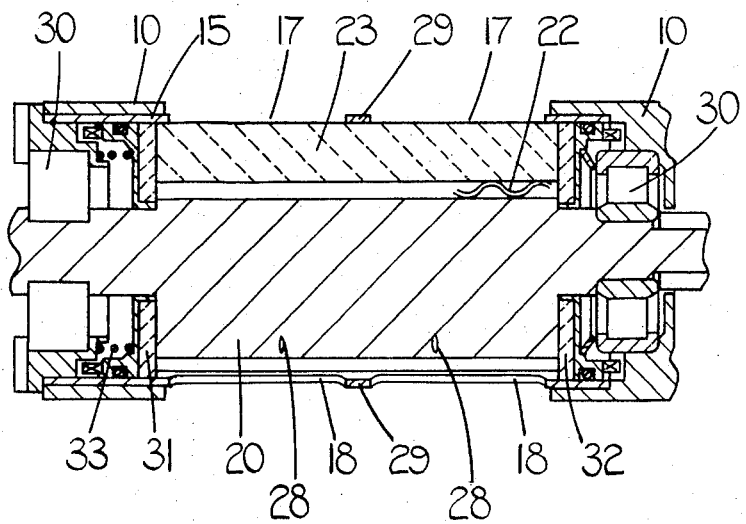
FIG. 2 is a section on line 2—2 in FIG. 1.

The valve has a housing 10 having an inlet port 11, a pair of outlet ports 12, 13 and an exhaust port 14. The housing 10 includes a cylindrical bush 15, the ports 11, 12, 13, 14 communicating with the bore of the bush 15 by means of respective slots 16, 17, 18, 19 which extend over substantially the whole of the length of the bush 15. Journalled in bearings 30 in the housing 10 and extending through the bush 15 for rotation about the axis thereof is a rotor body 20 which forms part of a control member 21 for the valve.

Figure 3:
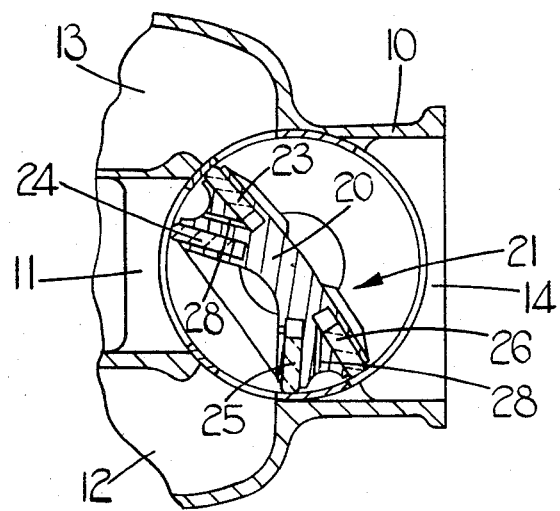
FIG. 3 is a section, corresponding to FIG. 1, with the valve in a different operating condition.

Control member 21 is rotatable in one direction from the position shown in FIG. 1 to the position shown in FIG. 3, so as to interconnect ports 11, 12 and ports 13, 14. Member 21 is also rotatable in the other direction to interconnect ports 11, 13 and ports 12, 14.

Radially slidable in the rotor body 20 and biased outwards against the bore of bush 12 by crinkle springs 22 are four carbon sealing elements in the form of vanes 23,24,25,26. The vanes are arranged in pairs 23, 24, and 25, 26, and the vanes in each pair are angularly spaced, as shown, so that their adjacent faces define included angles greater than the angles subtended at the centre of rotation of body 20 by the respective slots 17, 18, so that the pairs 23, 24 and 25, 26 can span the one of the slots 17, 18 with which these pair of vanes cooperate. The vanes 24,25 can similarly span the slot 16.

Passages 27 in the rotor body 20 are positioned so as to communicate at all times with the inlet port 11 and open into spaces defined between the rotor body 20 and the respective radially facing inner surfaces of vanes 24, 25. Vanes 24,25 are thus urged outwardly by the pressure in port 11, into sealing engagement with the bores of bush 15, in all positions of the control member 21.

The spaces defined between the body 20 and the inner surfaces of vanes 23, 26 communicate via passages 28 with respective zones between the vane pairs 23, 24 and 25, 26. In the position shown in FIG. 1 neither of vanes 23, 26 is responsive to the pressure in inlet port 11. In the position shown in FIG. 3 vane 23 is urged outwardly by the pressure in inlet port 11. In the opposite position of member 21, in which ports 11, 13 are interconnected, vane 26 is urged outwardly by the pressure in inlet port 11.

As the vanes traverse the slots 16, 17, 18, 19, in the bush 15 they are retained in the rotor body 20 not only by engagement with the opposite axial ends of the bush 15 but also by portions 29 of bush 15 which extend around the circumference thereof and effectively divide the slots 16, 17, 18, 19 into two parts.

In a preferred embodiment of the invention, the vanes 23, 24, 25, 26 are formed of a relatively soft carbon, as for example that commercially available under the designation 5890 PM, from Societe Le Carbone-Lorraine of Paris, France. This carbon is sufficiently soft that foreign particles, in a fluid flowing through the valve, can become embedded in the vanes, or will cut or score these vanes, instead of jamming the valve by becoming engaged between a vane edge and an edge of one of the slots 16, 17, 18.

The valve is particularly applicable for use with gases at high temperatures, in which conditions filtering of the gas presents problems, whereby the presence of foreign particles can be expected.

We claim:

1. A valve for fluids, comprising a housing having a cylindrical bore, four ports opening into said bore and respectively providing, in use, an inlet connection, two outlet connections and an exhaust connection, a control member mounted for pivotal movement about the axis of said bore, said control member including a body and four sealing elements slidably mounted on said body and engageable with the wall of said bore so as to define a plurality of spaces between said wall and said control member, said control member being movable between a first position in which said ports are isolated from each other and a second position in which one pair of said ports is interconnected by one of said spaces and another pair of said ports is interconnected by another of said spaces, and four passages in said body communicating with faces on respective ones of said elements remote from said wall, the passages associated with the elements which in said first position isolate said inlet connection communicating with said inlet connection, and the passages associated with the elements which in said first position isolate said exhaust connection respectively communicating, in said first position, with said outlet connections.

2. A valve as claimed in claim 1 in which said sealing elements comprise vanes extending radially of the axis of rotation of said body.

3. A valve as claimed in claim 2 in which said vanes are formed of carbon.

4. A valve as claimed in claim 3 in which said carbon is sufficiently soft as to be cut by particles in a fluid passing, in use, through the valve, should said particles become engaged between a vane and said bore.

* * * * *